(12) United States Patent
Ewanochko et al.

(10) Patent No.: US 6,647,705 B2
(45) Date of Patent: Nov. 18, 2003

(54) FLEX WING ROTARY CUTTER HAVING CUSHIONING STRUT MOUNTED ACROSS WING HINGE

(75) Inventors: Terrance William Ewanochko, Welland (CA); Radu Traian Guja, St. Catharines (CA)

(73) Assignee: Deere & Company, Moline, IL (US)

( * ) Notice: Subject to any disclaimer, the term of this patent is extended or adjusted under 35 U.S.C. 154(b) by 7 days.

(21) Appl. No.: 09/902,514

(22) Filed: Jul. 9, 2001

(65) Prior Publication Data

US 2003/0041580 A1 Mar. 6, 2003

(51) Int. Cl.[7] .................... A01D 34/24; A01D 34/42; A01D 34/63
(52) U.S. Cl. ................................ 56/15.2; 56/15.9
(58) Field of Search ................ 56/6, 255, 15.2, 56/15.5, 15.6, 15.7, 15.8, 15.9, 13.6, 16.2, 228, 16.3; 172/75, 103

(56) References Cited

U.S. PATENT DOCUMENTS

| | | | |
|---|---|---|---|
| 3,400,521 A | * 9/1968 | Caldwell | 172/311 |
| 3,736,735 A | * 6/1973 | Kulak et al. | 56/13.6 |
| 3,941,194 A | * 3/1976 | Orthman | 16/262 |
| 4,304,086 A | * 12/1981 | Stuchl | 280/443 |
| RE31,209 E | * 4/1983 | Anderson | 172/311 |
| 4,497,160 A | * 2/1985 | Mullet et al. | 56/11.6 |
| 4,538,400 A | * 9/1985 | Hottes | 172/75 |
| 4,858,417 A | * 8/1989 | Priefert et al. | 56/13.6 |
| 4,926,621 A | * 5/1990 | Torras | 280/494 |
| 5,069,022 A | * 12/1991 | Vandermark | 56/15.5 |
| 5,133,174 A | * 7/1992 | Parsons, Jr. | 56/10.9 |
| 5,715,667 A | * 2/1998 | Goman et al. | 56/13.6 |

OTHER PUBLICATIONS

Deere Advertising Brochure, dated Aug., 1994, p. 14, relating to John Deere Model 1517 Flex–wing Rotary Cutter.
Land Pride Advertising Brochure, dated Jul. 1996, back page, relating to Land Pride Model RC5015 Rotary Cutter.
Bush Hog Advertising Brochure for Bush Hog Series 2610, 3610 and 2614 Rotary Cutters, undated but illustrates subject matter developed prior to that of the present invention, middle section relating to Model 3610 Flex–wing Rotary Cutter.

* cited by examiner

Primary Examiner—Robert E. Pezzuto
Assistant Examiner—Árpád Fab Kovács

(57) ABSTRACT

A rotary cutter has a deck assembly including a central unit to which a wing unit is attached for flexing vertically. A hydraulic cylinder is provided for lifting the wing unit 90° to a fully raised transport or shipping position. Located above, and extending generally parallel to, the hydraulic cylinder is a telescopic strut incorporating a spring which becomes compressed as the wing unit approaches its fully raised position, the compressed spring unloading to thrust the wing unit down upon pressure being released from the hydraulic cylinder, even if the weight of the wing unit is tending to keep it in its raised position. Wing unit may be locked in its raised position by inserting a pin through the telescoped members of the strut when the latter is in its fully collapsed condition.

10 Claims, 3 Drawing Sheets

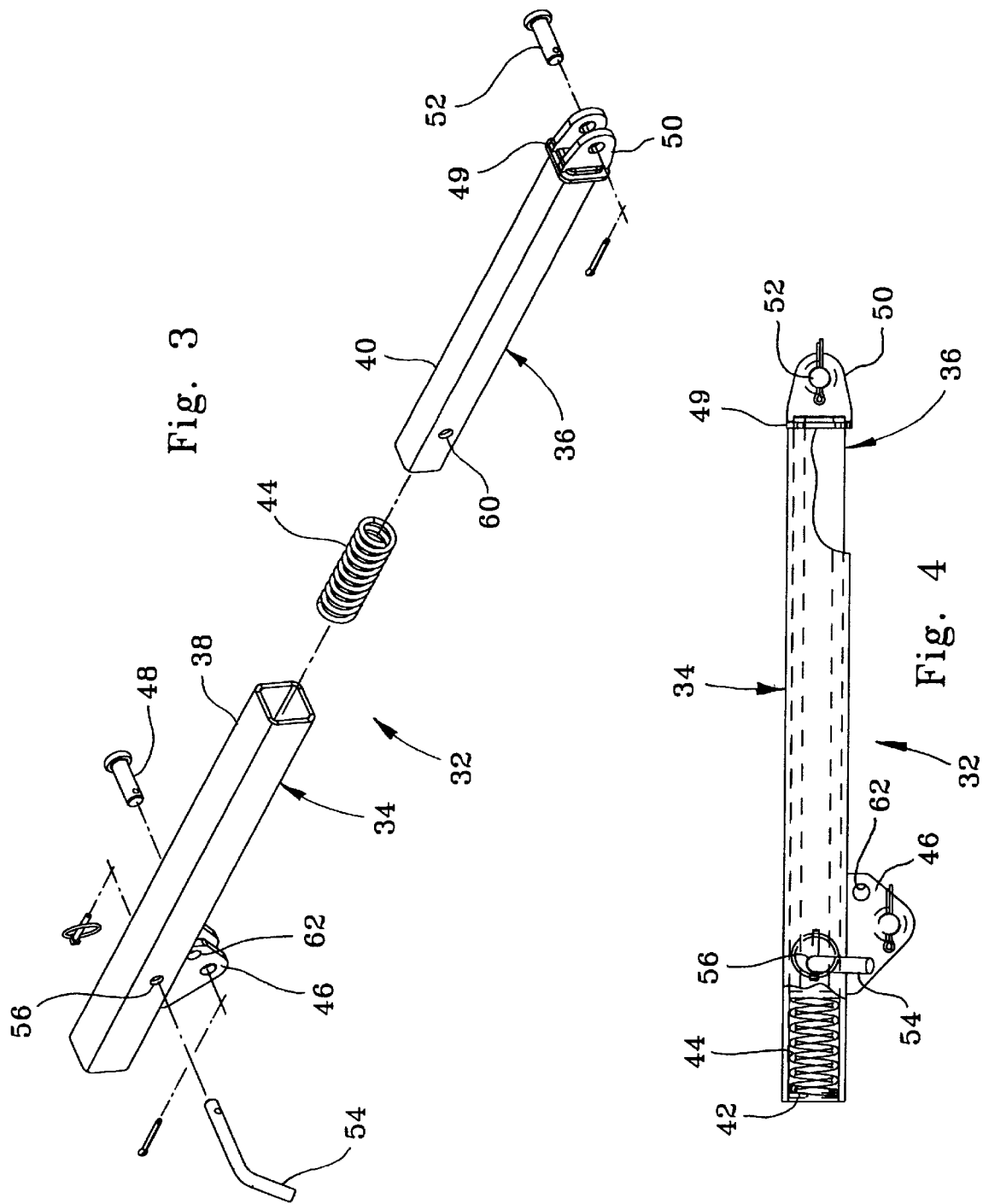

FLEX WING ROTARY CUTTER HAVING CUSHIONING STRUT MOUNTED ACROSS WING HINGE

FIELD OF THE INVENTION

The present invention relates to rotary cutters having flexible wings, and more specifically, relates to mechanisms for locking the wings in a folded condition for transport, servicing or storage.

BACKGROUND OF THE INVENTION

A flex wing rotary cutter must include a locking mechanism for locking the wing(s) up for transporting, servicing and storing the machine. Another requirement is for there to be a solid stop to restrict the wing from being raised past its intended angle. Also, if the cutter is plumbed with a single-acting cylinder acting for controlling the raising and lowering of the wing and is positioned across an incline with the wing raised over center, there is a chance the wing will not lower without assistance. This becomes an inconvenience and is potentially harmful for the operator.

In one known arrangement used to minimize this situation, each wing of the cutter is only raised to about 85°, but this works on only smaller cutters. On 20' cutters, for example, a removable stop is required so that the wing can be raised to 90° for shipping (the maximum shipping width is 102"). When the cutter reaches its destination, the removable stop must be installed by the dealer to again limit the wing to prevent it from pivoting upward beyond about 85°.

In other cutter designs, a compression spring or rubber bumper, which is independent of the wing lock mechanism, is used to cushion and stop the wings as they are raised and provide a slight initial force when lowering. These thrust members are located close to the wing hinge point offering a relatively low force to propel the wing down. Furthermore, the lock and stop members are positioned away from each other, therefore imposing unnecessary loading into the structural members that can lead to premature failures. The most common wing lock mechanisms used are either a strap pinned along side the cylinder or a pin that locks the wing to the center section through straps on top of and at the front of the hinge stringers.

SUMMARY OF THE INVENTION

According to the present invention, there is provided a flex wing rotary cutter having a new arrangement for controlling the pivoting of each wing.

An object of the invention is to provide a flex wing cutter wherein a single assembly is provided for locking the wing unit in a 90° raised position to minimize the transport/shipping width of the cutter, providing a cushioning for the wing unit as it approaches the 90° raised position and there providing a positive stop preventing the wing unit from going over center and providing a lowering force that can overcome the weight of the wing when the folded wing is on the upside and the cutter is on an incline.

A more specific object of the invention is to provide a cutter having a wing control arrangement, as set forth in the previous object, wherein the arrangement is in the form of a strut including first and second sections connected together for permitting lost motion between them, a spring for being loaded to resist movement of the wing unit as the strut becomes collapsed as the wing unit approaches a maximum folded position, the loaded spring acting to force the wing unit towards its lowered working position when the lifting force on the wing unit is discontinued and the collapsed strut being selectively fixed in its collapsed condition thus locking the wing unit in its raised position for transport or shipping.

These and other objects will become apparent from a reading of the following description together with the appended drawings.

BRIEF DESCRIPTION OF THE DRAWINGS

FIG. 3 is an exploded view of the telescopic strut and spring forming the combined locking and cushioning arrangement of the invention.

FIG. 4 is a side view of the strut shown in FIG. 3, with the strut being shown in a fully collapsed, locked condition, corresponding to that shown in FIG. 2.

DESCRIPTION OF THE PREFERRED EMBODIMENT

Figure 1:
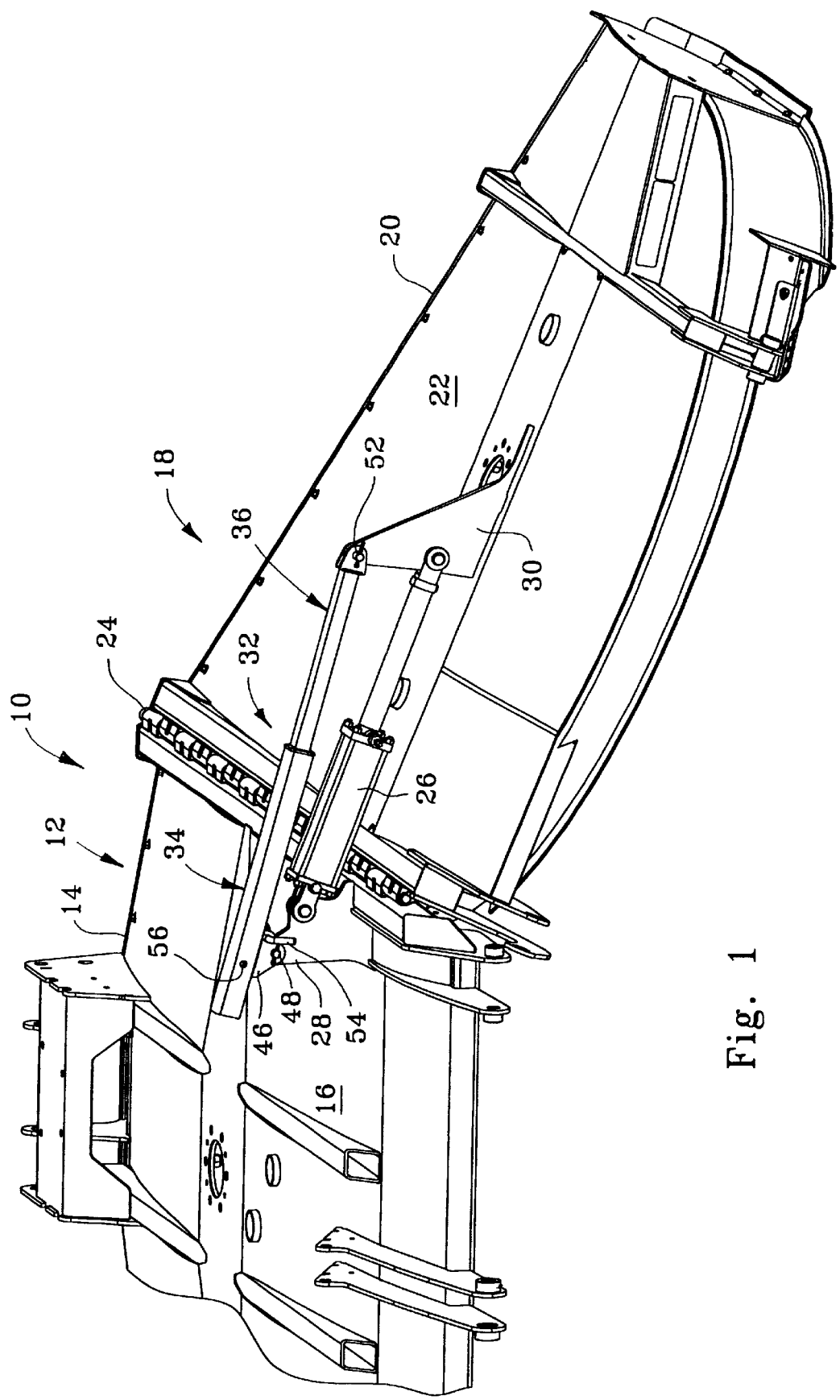
FIG. 1 is a right rear perspective view of the mower deck assembly of a flex wing rotary cutter embodying a combined locking and cushioning arrangement constructed in accordance with the present invention, with the wing being shown in a lowered working position.
Figure 2:
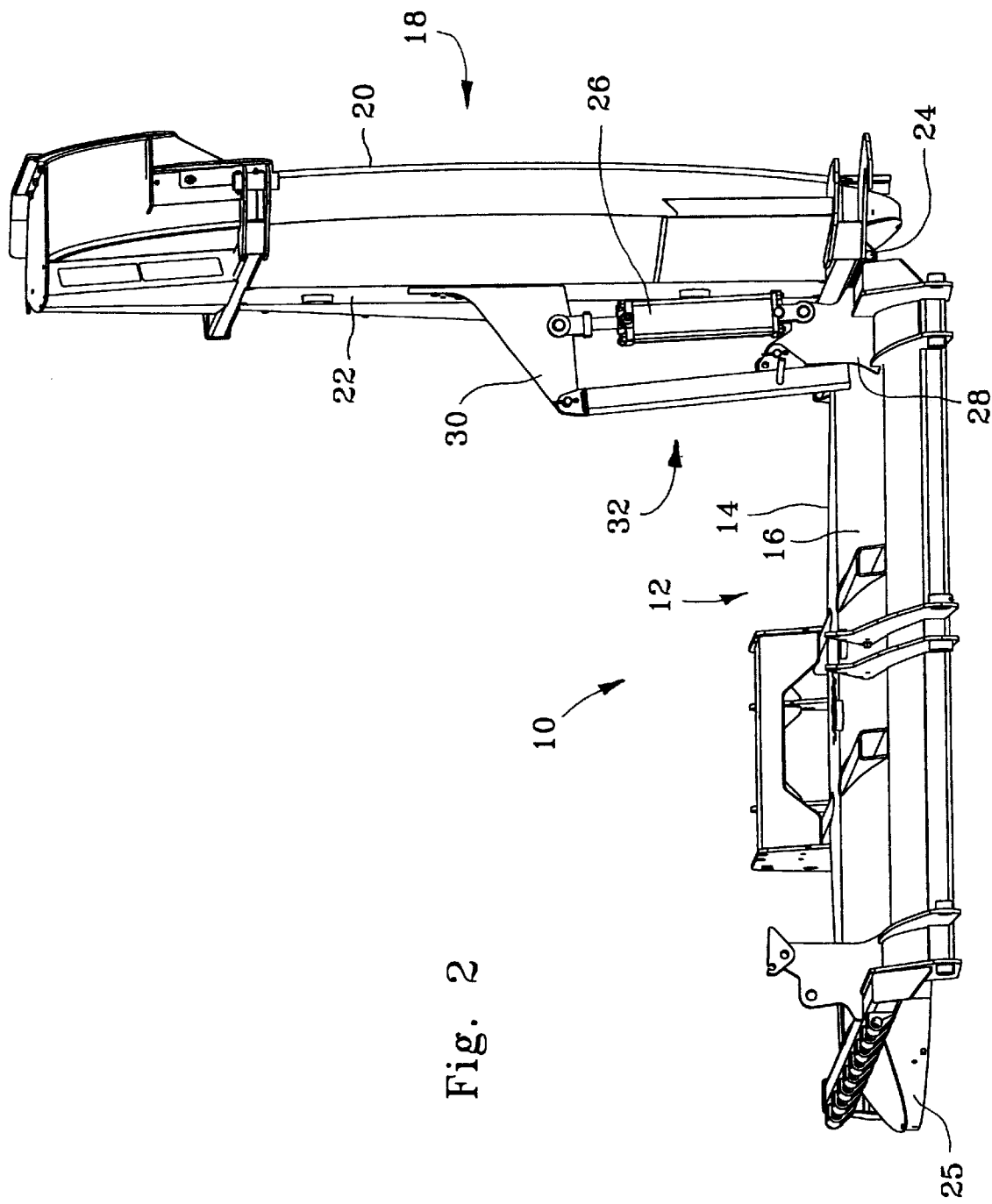
FIG. 2 is a rear view of the rotary cutter mower deck assembly shown in FIG. 1, with the wing being shown locked in a raised transport or shipping position.

Referring now to FIGS. 1 and 2, there is shown a flex wing rotary cutter mower deck assembly 10 comprising a central unit 12 including a blade housing 14 provided with a top wall 16. A wing unit 18, including a blade housing 20 having a top wall 22, is attached along the right-hand side of the central unit 12 by a hinge arrangement 24 defining a horizontal, fore-and-aft pivot axis about which the wing unit 18 may flex during cutting operation and may be pivoted 90° to a vertical transport or shipping position, as illustrated in FIG. 2. It is to be understood that a set of support wheels, not shown for simplicity, would normally be coupled, through arms, to a transverse wheel support shaft assembly that is coupled to the rear of the central and wing units 14 and 18. Also not shown is a, self-leveling hitch assembly that would be mounted to the front of the central unit 12 and interlocked with the wheel support shaft, in a manner well known in the art. Further, it is to be understood that instead of a housing end member 25 being used to close off the left-hand end of the central unit 22, a further wing unit, which is the mirror image of the wing unit 14, could be pivotally attached along the left-hand side of the central unit 12.

Provided for lifting the wing unit 18 into its transport or shipping position is a single-acting wing lift cylinder 26 having its cylinder end coupled to a first upstanding bracket 28 fashioned from a plate and fixed to an outer central location of the top wall 16 of the central unit 12, and having its rod end coupled to a second upstanding bracket 30, also fashioned from a plate and fixed to a central location of the wing unit housing top wall 22 between opposite ends of the wing unit 18. The wing lift cylinder 26 extends generally horizontally in an extended state when the wing unit 18 is in a lowered working position with both the central unit 12 and wing unit being disposed more-or-less coplanar relative to each other on a level surface.

Up to this point, the described mower deck assembly is more or less conventional.

Forming the essence of the present invention is a combined compression and locking strut 32 that is connected between upper locations of the brackets 28 and 30 in generally parallel relationship to the lift cylinder 26. Referring now also to FIGS. 3 and 4, it can be seen that the strut 32 includes first and second sections 34 and 36, respectively, formed primarily of elongate tubes 38 and 40 that are of square cross section, with the tube 40 of the second section 36 being dimensioned smaller than, and received for sliding within the tube 38 of the first section 34. One end of the tube 38 of the first section 34 is closed by an end wall 42. A coil compression spring 44 is received in the tube 38 between an end of the tube 40 and the end wall 42 so as to become compressed when the strut is fully collapsed, as shown in FIGS. 2 and 4. Fixed to an underside of the tube 38 at a location spaced lengthwise of the tube 38 from the closed end wall 42 are a pair of parallel plates which define a mounting bracket 46, the plates of the bracket 46 being located on opposite sides of the bracket 28 of the deck central unit 12 and pivotally coupled thereto by a pin 48. Fixed to an end of the tube 40 of the strut second section 36 is a plate 49 having parallel plates 50 joined thereto and between which the bracket 30 of the deck wing unit 18 is received and to which the bracket 30 is pivotally coupled by a pin 52.

Provided for locking the strut 32 in a fully collapsed position for holding the wing unit 18 in its upwardly folded transport or shipping position, shown in FIG. 2, is a latch pin 54 which is received in aligned holes 56 and 60, respectively provided in the tubes 38 and 40. When the deck wing unit 18 is in its lowered working position, as shown in FIG. 1, the latch pin 54 is stored in aligned holes 62 provided in the spaced plates of the bracket 46.

The operation of the deck assembly 10 of the flex wing cutter is briefly as follows:

Assuming the deck assembly 10 to be in a working position with the wing unit 18 lowered, as shown in FIG. 1, the single-acting hydraulic cylinder 26 will be in a non-pressurized float condition, and the strut 32 will be in a free telescoping condition, whereby the wing unit 18 will flex up and down about the hinge joint 24 relative to the central unit 12 in response to passing over undulations in the terrain being mowed.

If it is desired to raise the wing unit 18 about the hinge joint 24, the cylinder 26 is pressurized so as to contract and pull on the wing unit 18 to elevate it to a desired position. Assuming it is desired to elevate the wing unit 18 the entire 90° about the hinge joint 24, then the cylinder 26 is moved towards its completely retracted position, as shown in FIG. 2. This likewise causes the strut 32 to become fully retracted, in which case the compression spring 44 becomes compressed so as to exert a force acting between the strut sections 34 and 36. Then, if it is desired to once again lower the wing unit 18 to its working position, the cylinder 26 is depressurized, permitting the compression spring 44 to expand and thrust the wing unit 18 toward its working position. The characteristics of the spring 44 are chosen such that it has the ability to cause movement of the wing unit 18 even if the deck assembly 10 is operating on an incline with the wing unit 18 on the upside with its weight acting to the inside of the hinge joint 24 so as to keep the wing unit 18 in its fully raised position.

When it is desired to lock the wing unit 18 in its fully raised transport or shipping position, as shown in FIG. 2, the latch pin 54 is removed from its stored position in the aligned holes 62 of the bracket 46 and inserted into the aligned set of holes 56 and 60 respectively provided in the tubes 38 and 40 of the strut first and second sections 34 and 36. It is noted that this alignment occurs automatically when the plate 49 of the strut second section 36 comes into engagement with the end of the strut first section 34.

Thus, it will be appreciated that the strut 32 is a simple, relatively inexpensive structure that performs the functions of cushioning the movement of the wing unit 18 as the latter approaches its 90° raised position, acting as a positive stop preventing the wing unit 18 from going beyond the 90° raised position, acting to force the wing unit 18 down from its 90° raised position upon the release of pressure from the cylinder 24 and acts to lock the wing unit 18 in its raised position upon the insertion of the lock pin 54.

Having described the preferred embodiment, it will become apparent that various modifications can be made without departing from the scope of the invention as defined in the accompanying claims.

What is claimed is:

1. In a flex wing rotary cutter including a deck assembly comprising a central unit, a wing unit hinged to said central unit for movement about a hinge axis between a lowered working condition and a raised transport position, a hydraulic cylinder coupled between the central unit and the wing unit for raising the latter to its transport position, and a latch structure coupled between said central unit and said wing unit for selectively securing said wing unit in its raised transport position, the improvement comprising: said latch structure being defined at least in part by an elongate strut including first and second sections, a lost-motion connection between said strut first and second sections permitting the latter to move between fully extended and retracted positions; first and second upstanding brackets being respectively fixed to said central and wing units at opposite sides of said hinge axis; said hydraulic cylinder having opposite ends respectively pivotally coupled to said first and second upstanding brackets; and said strut being mounted to said first and second brackets at respective locations above the opposite ends of the hydraulic cylinder, with said strut first section being coupled to said central unit and said strut second section being coupled to said wing unit such that said strut extends across, and crosswise to, said hinge axis; said strut collapsing to its retracted position in response to said wing unit being pivoted to said transport position; and a locking member being coupled to said first and second sections of said strut for fixing them together in said retracted position of said strut and thereby locking said wing unit in said transport position.

2. The flex wing rotary cutter defined in claim 1 and further including a resilient cushioning member located in a path of movement of said second section of said strut for being compressed by said second section as said wing unit approaches said transport position, whereby a force is imposed on said wing unit for moving it towards its lowered position when working pressure is removed from said hydraulic cylinder.

3. The flex wing rotary cutter defined in claim 2 wherein said first section of said strut is tubular; said second section of said strut being received for telescoping within said first section; and said cushioning member being received in said first section at a location between an end of said second section of said strut and a stop surface of said first section of said strut.

4. In a flex wing rotary cutter including a deck assembly comprising a central unit, a wing unit hinged to said central unit for movement about a hinge axis between a lowered working condition, wherein said wing unit is substantially co-planar with said central unit, and a raised transport position, wherein said wing unit makes an angle of approximately 90° with said central unit, a hydraulic cylinder coupled between the central unit and the wing unit for raising the latter to its transport position, the improvement comprising: an elongate strut including first and second sections, a lost-motion connection between said strut first and second sections permitting the strut to move between fully extended and fully retracted positions; said strut first section being coupled at a fixed location of said central unit and said strut second section being coupled at a fixed location of said wing unit such that said strut extends across, and crosswise to, said hinge axis; said strut collapsing to its fully retracted position in response to said wing unit being pivoted to said transport position; and a resilient compression member being carried by said central unit in a location in a path of movement of said strut second section and being constructed so as to be compressed by said second section only as said strut approaches said fully retracted position during movement of said wing unit to said transport position, whereby said compression member acts through said second section to impart a lowering force on said wing unit when a working fluid pressure is removed from said hydraulic cylinder at a time when said wing unit is in its transport position.

5. The flex wing cutter defined in claim 4 wherein said strut first section is tubular; said strut second section being slidably received within said first section; and said compression member being located in said first section.

6. The flex wing rotary cutter defined in claim 4 and further including a locking member associated with said first and sections of said strut for securing them together when they are collapsed, whereby said strut acts to lock said wing unit in its transport position.

7. The flex wing rotary cutter defined in claim 6 wherein said first section of said strut is tubular; said second section of said strut being received for sliding within said first section; said first and second sections respectively including first and second cross bores which are axially aligned with each other when said wing unit is in its transport position; and said locking member including a latch pin for being received in said first and second cross bores for locking said wing unit in its transport position.

8. The flex wing rotary cutter defined in claim 7 wherein said second section of said strut has a stop surface located therealong for engagement with an end of said first section when said wing unit is raised to its transport position, thereby creating a positive stop preventing movement of said wing unit beyond said transport position; and said first and second cross bores being axially aligned with each other when said stop surface of said second section comes into engagement with said first section.

9. The flex wing rotary cutter defined in claim 4 wherein said central and wing units respectively include upwardly projecting first and second brackets; said hydraulic cylinder having its opposite ends respectively pivotally attached to said first and second brackets; and said strut first and second sections respectively being coupled to said first and second brackets.

10. The flex wing rotary cutter defined in claim 9 wherein said strut is arranged generally parallel to and is located above said hydraulic cylinder when the wing unit is located in a lowered working condition.

\* \* \* \* \*